US012569825B1

(12) United States Patent
Alhamzani et al.

(10) Patent No.: US 12,569,825 B1
(45) Date of Patent: Mar. 10, 2026

(54) METHOD FOR FABRICATING ORGANIC NANOCOMPOSITE

(71) Applicant: IMAM MOHAMMAD IBN SAUD ISLAMIC UNIVERSITY, Riyadh (SA)

(72) Inventors: Abdulrahman Ghonaim A. Alhamzani, Riyadh (SA); Mohamed Abdellah Lemine Kerim, Riyadh (SA); Saad Abdullah Aljlil, Riyadh (SA); Mortaga Mohamed M. Abou-Krisha, Riyadh (SA); Suliman Shadad A. Alharbi, Riyadh (SA)

(73) Assignee: IMAM MOHAMMAD IBN SAUD ISLAMIC UNIVERSITY, Riyadh (SA)

( * ) Notice: Subject to any disclaimer, the term of this patent is extended or adjusted under 35 U.S.C. 154(b) by 0 days.

(21) Appl. No.: 19/281,575

(22) Filed: Jul. 26, 2025

(51) Int. Cl.
*B01J 20/18* (2006.01)
*B01J 20/28* (2006.01)
*B01J 20/30* (2006.01)

(52) U.S. Cl.
CPC ....... *B01J 20/183* (2013.01); *B01J 20/28009* (2013.01); *B01J 20/28028* (2013.01); *B01J 20/3021* (2013.01); *B01J 20/3071* (2013.01); *B01J 20/3078* (2013.01); *B01J 20/3085* (2013.01)

(58) Field of Classification Search
CPC .............. B01J 20/183; B01J 20/28009; B01J 20/28028; B01J 20/3021; B01J 20/3071; B01J 20/3078; B01J 20/3085
See application file for complete search history.

(56) References Cited

U.S. PATENT DOCUMENTS

2018/0186664 A1     7/2018   Alkendi et al.

FOREIGN PATENT DOCUMENTS

CN     106633200 A     5/2017
CN     108744845 A     11/2018

OTHER PUBLICATIONS

Alhamzani et al (NPL: "Isolation Cellulose Nanofiers from Date-Palm Tree Leaflets (*Phoenix dactylifera* L.) by Ball-Milling Technique", Journal of Applied Sciences, 2022, vol. 22, issue 5 pp. 241-247).*

(Continued)

*Primary Examiner* — Smita S Patel
(74) *Attorney, Agent, or Firm* — Oblon, McClelland, Maier & Neustadt, L.L.P.

(57) ABSTRACT

A method of making a zeolite USY/carboxylated cellulose nanocomposite (CCN) includes preparation of carboxylated cellulose nanofibers (CCNFs) by grinding date-palm tree leaflets into fine particles, oxidizing with $HNO_3$ and $NaNO_2$ at 80-90° C. for 8-12 hours, quenching, washing, and centrifuging to obtain the CCNFs. The method further includes preparation of zeolite USY nanoparticles by wet ball milling zeolite USY, washing, centrifuging, drying at 60-100° C. for 60-120 minutes, and crushing to obtain the zeolite USY nanoparticles. The method further includes the synthesis of the zeolite USY/carboxylated cellulose nanocomposite by mixing zeolite USY nanoparticles with CCNFs and triethylamine, autoclaving at 60-80° C. for 15-30 hours, cooling, centrifuging, and drying at 50-80° C. for 15-30 hours to form the zeolite USY/CCN.

19 Claims, 7 Drawing Sheets

(56) References Cited

OTHER PUBLICATIONS

Hsiao et al (WO2017082900 A1, machine translation).*

Dounia Bendahou, et al., "Nano-fibrillated cellulose-zeolites based new hybrid composites aerogels with super thermal insulating properties", Industrial Crops and Products, 2014, http://dx.doi.org/10.1016/j.indcrop.2014_11.012, 10 pgs.

Mostafa Ahmed Ibrahim, et al., "Fabrication of cellulose nanocrystals/carboxymethyl cellulose/zeolite membranes for methylene blue dye removal: understanding factors, adsorption kinetics, and thermodynamic isotherms", Frontiers in Chemistry, vol. 12, 1330810, Feb. 2, 2024 (18 pgs).

Dhruba Jyoti Sarkar, et al., "Synthesis and Characterization of Poly (CMC-g-cl-PAam/Zeolite) Superabsorbent Composites for Controlled Delivery of Zinc Micronutrient: Swelling and Release Behavior", Polymer-Plastics Technology and Engineering, vol. 54, Issue 4, Feb. 23, 2015, pp. 357-367 (abstract only).

* cited by examiner

Det: Element

METHOD FOR FABRICATING ORGANIC NANOCOMPOSITE

BACKGROUND

Technical Field

The present disclosure is directed towards a method of making a nanocomposite, and more particularly, towards a plant-derived formulation and method for producing a zeolite USY (ultrastable Y-type Zeolite)/carboxylated cellulose nanocomposite.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly nor impliedly admitted as prior art against the present disclosure.

The dual challenges of rising energy demands and water scarcity have become urgent issues, with water scarcity arising from both limited availability and deteriorating water quality. Additionally, the inefficient disposal of biomass waste, including from agriculture, exacerbates environmental concerns, highlighting the need for innovative waste management and resource utilization strategies. The United Nations defines severe water scarcity as having less than 500 cubic meters of water per capita per year. In the Gulf Cooperation Council (GCC) countries, all member states except Oman fall under the classification of severe water scarcity. Annual rainfall varies across Saudi Arabia, with the northern region receiving up to 200 mm, while the southern region receives only about 100 mm.

As part of Vision 2030, Saudi Arabia is transitioning from conventional energy sources to renewable alternatives, addressing environmental challenges, and setting an example for other nations. The country leads globally in desalinated water production, with 70% of its municipal water sourced from desalination, though it meets only 50% to 70% of its total water needs [DeNicola, E., et al., Climate change and water scarcity: the case of Saudi Arabia, *Annals of Global Health*, Volume 81, Issue 3, 2015, pages 342-353]. Saudi Arabia is additionally one of the largest regions for date palm tree cultivation, with over 30 million trees spanning approximately 160,000 hectares [Mwinami, N., et al., Data preservation practices for enhancing agricultural research data usage among agricultural researchers in Tanzania, *Journal of Librarianship and Information Science*, 56, 1, 198-210], which generates an estimated 200,000 tons of biomass waste annually [Labib, W., Utilisation of date palm fiberss in cement-based composites: A feasibility study, *IOP Conf. Ser.: Mater. Sci. Eng.*, 596, 012028, 2019]. However, the disposal and management of such large amounts of biomass waste pose environmental and economic challenges. Future research should focus on sustainable methods to repurpose this waste into valuable resources, addressing both water scarcity and environmental concerns.

In line with Vision 2030's commitment to environmental protection and improved waste management, innovative methods for repurposing date palm biomass waste are required. Converting this agricultural byproduct into high-value materials that be used to alleviate water scarcity not only addresses waste management issues but also offers potential relief to water scarcity challenges in dry climates. Palm waste is primarily composed of fibers with properties like biodegradability, recyclability, and weather resistance. According to previous analysis, the average mass percentage of chemical components of date-palm trees includes approximately 35%-40% cellulose, 20%-28% hemicelluloses, 15%-30% lignin, and 2%-10% ashes [Adil, S., et al., Short date palm tree fibers/polyepoxy composites prepared using RTM process: effect of TEMPO mediated oxidation of the fibers, *BioResources*, 5, 2, 2010]. The palm fibers contain cellulose embedded in a lignin matrix, providing strong mechanical properties. The structure contains a primary wall surrounded by three secondary walls made up of cellulose, hemicellulose, and lignin. Utilization of this large amount of date-palm tree waste into either fibral or crystalline materials has attracted many researchers using different technologies such as physio-chemical, thermal, and biochemical methods. Chemical treatments include processes such as sodium hydroxide treatment, acetylation, graft copolymerization [Hakeem, K., et al., Biomass and bioenergy: Processing and properties, *Biomass Bioenergy Process. Prop.*, 2014], silane treatment [Li, X., et al., Chemical treatments of natural fiber for use in natural fiber-reinforced composites: A review, *J Polym Environ*, 15, 25-33, 2007], acrylation and acrylonitrile grafting [Sanjay, M., et al., A comprehensive review of techniques for natural fibers as reinforcement in composites: Preparation, processing and characterization, *Carbohydrate Polymers*, Volume 207, 2019, pages 108-121], and peroxide treatment [Belgacem, C., et al., High-yield lignocellulosic fibers from date palm biomass as reinforcement in polypropylene composites: Effect of fiber treatment on composite properties, *Polymers*, 2020, 12, 6, 1423]. However, extracting valuable materials from palm fibers presents challenges due to the complex structure. Traditional methods often require harsh chemicals or high energy usage, raising environmental concerns and increasing production costs. Lignin also complicates cellulose extraction, impeding the process. Therefore, researchers are focusing on developing more efficient, eco-friendly techniques that minimize energy consumption and reduce the environmental impact of these processes. Alternative approaches such as enzymatic treatments, physical treatments, or green chemistry methods are being explored to improve the extraction of cellulose while overcoming the limitations posed by lignin and other complex components in palm fibers.

Converting palm waste into nanocomposites offers potential solutions for applications like water purification and energy storage. However, scalability and cost-effectiveness remain challenges for large-scale production, requiring further research to improve these methods and unlock the full potential of date palm biomass. Addressing these challenges can make date palm biomass-based nanocomposites viable for widespread industrial applications.

Accordingly, one object of the present disclosure is to provide a method of making a zeolite USY/carboxylated cellulose nanocomposite, that may circumvent the drawbacks and limitations, such as, harsh chemical treatments, high energy consumption, low scalability, and environmental concerns, of the materials and methods already known in the art.

SUMMARY

In an exemplary embodiment, a method of making a zeolite USY (Ultra-Stable Y)/carboxylated cellulose nanocomposite is described. The method includes grinding date-palm tree leaflets to form ground date-palm tree leaflets, adding sodium nitrate ($NaNO_2$) stepwise to a mixture including ground date-palm tree leaflets and nitric acid ($HNO_3$) to form a first reaction mixture, stirring the first reaction mixture at 80 degrees Celsius (° C.) to 90° C. for 8 hours to 12 hours (h), adding distilled water (DW) to the first reaction mixture to form a quenched mixture, washing the quenched mixture with distilled water, centrifuging the quenched mixture to collect carboxylated cellulose nanofibers (CCNF), and equilibrating the carboxylated cellulose nanofibers in distilled water to form equilibrated carboxylated cellulose nanofibers.

The method further includes wet ball milling zeolite USY to form wet ground zeolite USY, rinsing wet ground zeolite USY with distilled water and centrifuging to collect a milled zeolite USY, drying the milled zeolite USY at 60° C. to 100° C. for 60 min to 120 min to form a dried zeolite USY, and crushing the dried zeolite USY to form a crushed zeolite USY nanoparticles.

Furthermore, the method includes mixing triethylamine ($C_6H_{15}N$) with a dispersion including crushed zeolite USY nanoparticles and carboxylated cellulose nanofibers to form a second reaction mixture, autoclaving the second reaction mixture at 60° C. to 80° C. for 15 hours (h) to 30 hours, cooling, and centrifuging to collect a wet product, and drying the wet product at 50° C. to 80° C. for 15 hours to 30 hours to form the zeolite USY/carboxylated cellulose nanocomposite.

In some embodiments, the zeolite USY/carboxylated cellulose nanocomposite has an adsorption capacity for iron ions of greater than or equal to 50 milligrams per gram (mg/g) at 20° C.

In some embodiments, the zeolite USY/carboxylated cellulose nanocomposite has an adsorption capacity for iron ions of greater than or equal to 60 mg/g at 20° C.

In some embodiments, the zeolite USY/carboxylated cellulose nanocomposite has an adsorption capacity for iron ions of greater than or equal to 75 mg/g at 20° C.

In some embodiments, the zeolite USY/carboxylated cellulose nanocomposite has an adsorption capacity for iron ions of greater than or equal to 80 mg/g at 20° C.

In some embodiments, the zeolite USY/carboxylated cellulose nanocomposite has an adsorption capacity for iron ions of greater than or equal to 82.5 mg/g at 30° C.

In some embodiments, the zeolite USY/carboxylated cellulose nanocomposite has an adsorption capacity for iron ions of greater than or equal to 85 mg/g at 30° C.

In some embodiments, the zeolite USY/carboxylated cellulose nanocomposite has an adsorption capacity for iron ions of greater than or equal to 87.5 mg/g at 40° C.

In some embodiments, the zeolite USY/carboxylated cellulose nanocomposite has an adsorption capacity for iron ions of greater than or equal to 90 mg/g at 40° C.

In some embodiments, the zeolite USY/carboxylated cellulose nanocomposite has a magnetization in a range of 1.5 electromagnetic unit per gram (emu/g) to 2.25 emu/g.

In some embodiments, the zeolite USY/carboxylated cellulose nanocomposite has a magnetization in a range of 1.75 emu/g to 2.00 emu/g.

In some embodiments, the zeolite USY/carboxylated cellulose nanocomposite has a magnetization of 1.88 emu/g.

In some embodiments, the concentration of $NaNO_2$ in the first reaction mixture is in a range from 130 grams per liter (g/L) to 150 g/L.

In some embodiments, the concentration of ground date-palm tree leaflets in the first reaction mixture is in a range from 60 g/L to 80 g/L.

In some embodiments, the concentration of triethylamine in the second reaction mixture is in a range from 35 milliliters per liter (ml/L) to 40 ml/L.

In some embodiments, the concentration of triethylamine in the second reaction mixture is 37 ml/L.

In some embodiments, the concentration of crushed zeolite USY nanoparticles in the second reaction mixture is in a range from 140 g/L to 160 g/L.

In some embodiments, the concentration of carboxylated cellulose nanofibers in the second reaction mixture is in a range from 140 g/L to 160 g/L.

In some embodiments, the second reaction mixture is autoclaved at 65° C. to 70° C. for 24 hours.

In another exemplary embodiment, the zeolite USY/carboxylated cellulose nanocomposite made using the aforementioned method.

The foregoing general description of the illustrative embodiments and the following detailed description thereof are merely exemplary aspects of the teachings of this disclosure and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1:
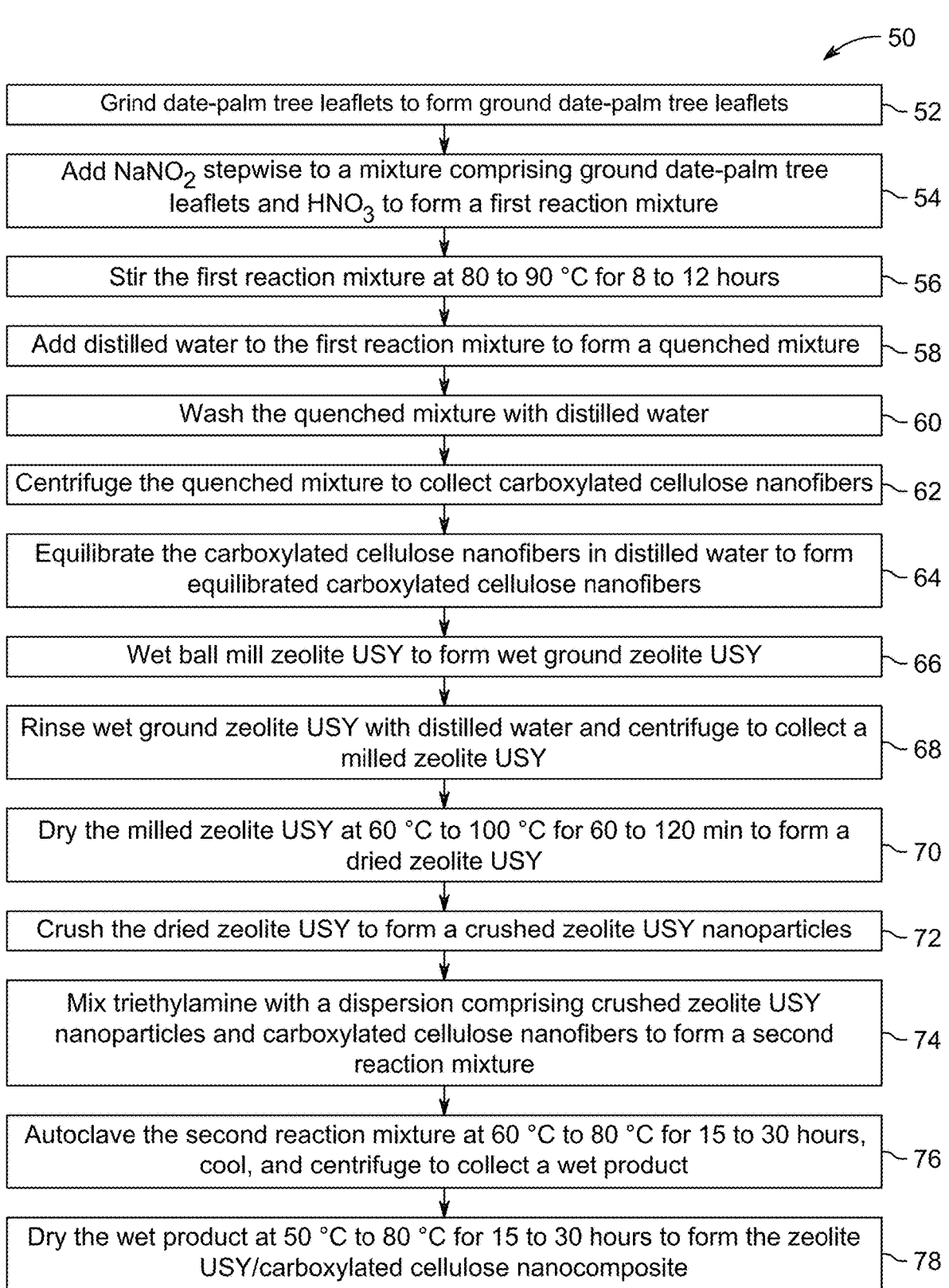
FIG. 1 is an exemplary flow chart of a method for fabricating a zeolite USY (Ultra Stable Y)/carboxylated cellulose nanocomposite, according to certain embodiments.

In the drawings, like reference numerals designate identical or corresponding parts throughout the several views. Further, as used herein, the words "a," "an" and the like generally carry a meaning of "one or more," unless stated otherwise.

Furthermore, the terms "approximately," "approximate," "about," and similar terms generally refer to ranges that include the identified value within a margin of 20%, 10%, or preferably 5%, and any values therebetween.

When describing the present disclosure, the terms used are to be construed in accordance with the following definitions, unless a context dictates otherwise.

Embodiments of the present disclosure will now be described more fully hereinafter with reference to the accompanying drawings wherever applicable, in that some, but not all, embodiments of the disclosure are shown.

As used herein, the term 'room temperature' refers to a temperature range of '25 degrees Celsius (° C.)+3° C. in the present disclosure.

As used herein, the term 'nanoparticles (NPs)' refers to particles having a particle size of 1 nanometer (nm) to 1000 nm within the scope of the present disclosure.

As used herein, the term 'nanocomposite' refers to a composite material that has at least one component with a grain size measured in nanometers.

As used herein, the term "zeolitic material" refers to a material having the crystalline structure or three-dimensional framework of, but not always the elemental composition of, a zeolite. Zeolites are porous silicate or aluminosilicate minerals that occur in nature. Elementary building units of zeolites are $SiO_4$ (and if appropriate, $AlO_4$) tetrahedra. Adjacent tetrahedra are linked at their corners via a common oxygen atom, which results in an inorganic macromolecule with a three-dimensional framework (frequently referred to as the zeolite framework). The three-dimensional framework of a zeolite also includes channels, channel intersections, and/or cages having dimensions in the range of 0.1-10 nanometers (nm), preferably 0.2-5 nm, more preferably 0.2-2 nm. Water molecules may be present inside these channels, channel intersections, and/or cages. Zeolites that are devoid of aluminum may be referred to as "all-silica zeolites" or "aluminum-free zeolites." Some zeolites that are substantially free of, but not devoid of, aluminum are called "high-silica zeolites." Sometimes, the term "zeolite" is used to refer exclusively to aluminosilicate materials, excluding aluminum-free zeolites or all-silica zeolites.

In some embodiments, the zeolitic material has a three-dimensional framework that is at least one zeolite framework selected from the group consisting of a 4-membered ring zeolite framework, a 6-membered ring zeolite framework, a 10-membered ring zeolite framework, and a 12-membered ring zeolite framework. The zeolite may have a natrolite framework (e.g. gonnardite, natrolite, mesolite, paranatrolite, scolecite, and tetranatrolite), edingtonite framework (e.g. edingtonite and kalborsite), thomsonite framework, analcime framework (e.g. analcime, leucite, pollucite, and wairakite), phillipsite framework (e.g. harmotome), gismondine framework (e.g. amicite, gismondine, garronite, and gobbinsite), chabazite framework (e.g. chabazite-series, herschelite, willhendersonite, and SSZ-13), faujasite framework (e.g. faujasite-series, Linde type X, and Linde type Y), mordenite framework (e.g. maricopaite and mordenite), heulandite framework (e.g. clinoptilolite and heulandite-series), stilbite framework (e.g. barrerite, stellerite, and stilbite-series), brewsterite framework, or cowlesite framework. In some embodiments, the porous silicate and/or aluminosilicate matrix is a zeolitic material having a zeolite framework selected from the group consisting of ZSM-5, ZSM-8, ZSM-11, ZSM-12, ZSM-18, ZSM-23, ZSM-35, and ZSM-39.

As used herein, the term 'ball-mill' refers to a grinding device that uses rotating cylindrical or spherical containers filled with grinding media, such as steel or ceramic balls, to reduce the particle size of materials through impact and attrition forces.

As used herein, the term 'autoclave' refers to a sealed, high-pressure vessel designed to subject materials to elevated temperatures and pressures, typically used for sterilization, chemical reactions, or material processing to enhance structural or chemical properties.

As used herein, the term 'centrifuge' refers to a device that uses rapid rotational motion to apply centrifugal force for the separation of substances based on density differences, commonly used for isolating solids from liquids or separating components in a mixture.

As used herein, the term 'magnetization' refers to the process by which a material acquires magnetic properties, typically through the alignment of its magnetic domains in response to an external magnetic field, resulting in the ability to attract or repel other magnetic materials.

As used herein, the term 'mortar and pestle' refers to a manual grinding tool consisting of a sturdy bowl (mortar) and a club-shaped implement (pestle), used to crush, grind, and mix solid materials into fine powders or pastes through mechanical force.

A weight percent of a component, unless specifically stated to the contrary, is based on the total weight of the formulation or composition in which the component is included. For example, if a particular element or component in a composition or article is said to have 5 wt. %, it is understood that this percentage is in relation to a total compositional percentage of 100%.

The present disclosure is intended to include all hydration states of a given compound or formula, unless otherwise noted or when heating a material.

In addition, the present disclosure is intended to include all isotopes of atoms occurring in the present compounds and complexes. Isotopes include those atoms having the same atomic number but different mass numbers. By way of general example, and without limitation, isotopes of hydrogen include deuterium and tritium, and isotopes of carbon include $^{13}C$ and $^{14}C$. Isotopes of oxygen include $^{16}O$, $^{17}O$, and $^{18}O$. Isotopically-labeled compounds of the disclosure may generally be prepared by conventional techniques known to those skilled in the art or by processes analogous to those described herein, using an appropriate isotopically-labeled reagent in place of the non-labeled reagent otherwise employed.

The present disclosure relates to a method of fabricating a zeolite USY/carboxylated cellulose nanocomposite from date-palm tree waste, serving as an eco-friendly adsorbent for the effective removal of cationic micropollutants and heavy metals.

FIG. 1A illustrates a schematic flow chart of a method 50 of making a zeolite USY/carboxylated cellulose nanocomposite material. The order in which the method 50 is described is not intended to be construed as a limitation, and any number of the described method steps can be combined to implement the method 50. Additionally, individual steps may be removed or skipped from the method 50 without departing from the spirit and scope of the present disclosure.

At step 52, the method 50 includes grinding date-palm tree leaflets to form ground date-palm tree leaflets. In some embodiments, various date palm tree components, including leaves, bark, husk, trunk, leaf sheath, pedicels, and seeds may also be used. In some embodiments, the date-palm tree leaflets may be ground with a ball mill, hammer mill, jet mill, pin mill, attritor mill, centrifugal mill, vibratory mill, planetary ball mill, roller mill, disc mill, pebble mill, bead mill, colloid mill, impact mill, cutter mill, knife mill, Wiley mill, rotor-stator mill, cryogenic grinder, ultrafine grinder, high-speed grinder, pulverizer, disintegrator, homogenizer, burr mill, conical mill, centrifugal impact mill, vortex mill, agitated media mill, or oscillating granulator. In some embodiments, the date-palm tree leaflets are ground until achieving a size ranging from 1-30 mm in length, preferably 1-10 mm in length, preferably 1-8 mm length, preferably 1-6 mm length, preferably 1-4 mm length, preferably 1-3 mm in length. In a preferred embodiment, the date-palm tree leaflets are ground a size of 1-2 mm in length.

At step 54, the method 50 includes adding $NaNO_2$ stepwise to a mixture including ground date-palm tree leaflets and $HNO_3$ to form a first reaction mixture. In some embodiments, other acids besides $HNO_3$ may be used and include, but are not limited to, $H_2SO_4$, HCl, HF, HBr, HI, $H_3PO_4$, $H_2CO_3$, $H_2C_2O_4$, $H_2S$, $CH_3COOH$, $C_6H_8O_7$, $H_2SeO_4$, $H_2CrO_4$, $H_2MoO_4$, $H_4SiO_4$, $HClO_4$, $HClO_3$, $HClO_2$, HClO, $HBrO_3$, $HIO_3$, $H_2MnO_4$, $HMnO_4$, $H_2WO_4$, $H_2TeO_4$, $H_2SnO_4$, HCOOH, $C_4H_6O_6$, $C_3H_6O_3$, and $C_7H_6O_2$. In a preferred embodiment, the acid is $HNO_3$.

In some embodiments, the concentration of $NaNO_2$ in the first reaction mixture is in a range from 100 to 175 g/L, preferably 130 to 150 g/L, preferably 135 to 150 g/L, preferably 139 to 150 g/L, preferably 140 to 150 g/L, preferably 145 to 150 g/L. In some embodiments, the concentration of ground date-palm tree leaflets in the first reaction mixture is in a range from 20 to 100 g/L, preferably 60 to 80 g/L, preferably 65 to 80 g/L, preferably 67 to 80 g/L, preferably 70 to 80 g/L, preferably 75 to 80 g/L. In some embodiments, the concentration of $HNO_3$ in the first reaction mixture is in a range from 10 to 250 g/L, preferably 140 to 160 g/L, preferably 145 to 160 g/L, preferably 149 to 160 g/L, preferably 150 to 160 g/L, preferably 155 to 160 g/L.

At step 56, the method 50 includes stirring the first reaction mixture at 80 to 90° C. for 8 to 12 hours. In some embodiments, the first reaction mixture is stirred at a temperature in a range from 70 to 100° C., preferably 80 to 90° C., preferably 82 to 88° C., preferably 84 to 86° C. In some embodiments, the first reaction mixture is stirred for 4 to 16 hours, preferably 8 to 12 hours, preferably 9 to 11 hours, preferably 9.5 to 10.5 hours. In a preferred embodiment, the first reaction mixture is stirred for 10 hours.

At step 58, the method 50 includes adding distilled water to the first reaction mixture to form a quenched mixture.

At step 60, the method 50 includes washing the quenched mixture with distilled water. In some embodiments, the quenched mixture may be washed with ethanol, methanol, isopropanol, acetone, hexane, chloroform, toluene, xylene, acetonitrile, diethyl ether, tetrahydrofuran, benzene, butanol, propanol, glycerol, ethyl acetate, dimethyl sulfoxide, formic acid, lactic acid, oxalic acid, citric acid, sodium hydroxide solution, potassium hydroxide solution, ammonium hydroxide solution, hydrochloric acid solution, sulfuric acid solution, phosphoric acid solution, brine, deionized water, saline solution, or mixtures thereof. In a preferred embodiment, the quenched mixture may be washed with distilled water multiple times using a decantation technique to increase the pH. In some embodiments, the pH of the quenched mixture after washing may range from 1-6, preferably 1-5, preferably 1-4, preferably 2-4, preferably 2.5-3.5. In a preferred embodiment, pH of the quenched mixture after washing is 3.2.

At step 62, the method 50 includes centrifuging the quenched mixture to collect carboxylated cellulose nanofibers. In some embodiments, the quenched mixture may be centrifuged at 5000 rpm, preferably 10000 rpm, preferably 11000 rpm, preferably 12000 rpm, preferably 13000 rpm, preferably 14000 rpm, preferably 15000 rpm. In a preferred embodiment, the quenched mixture is centrifuged at 12000 rpm.

At step 64, the method 50 includes equilibrating the carboxylated cellulose nanofibers in distilled water to form equilibrated carboxylated cellulose nanofibers. In some embodiments, the carboxylated cellulose nanofibers were equilibrated for 18 to 52 hours, preferably 20 to 50 hours, preferably 25 to 50 hours, preferably 30 to 52 hours, preferably 35 to 52 hours, preferably 40 to 52 hours, preferably 45 to 52 hours, preferably 45 to 50 hours. In a preferred embodiment, the carboxylated cellulose nanofibers were equilibrated for 48 hours.

At step 66, the method 50 includes wet ball milling zeolite USY to form wet ground zeolite USY. In some embodiments, the zeolite USY may be ground with a ball mill, hammer mill, jet mill, pin mill, attritor mill, centrifugal mill, vibratory mill, planetary ball mill, roller mill, disc mill, pebble mill, bead mill, colloid mill, impact mill, cutter mill, knife mill, Wiley mill, rotor-stator mill, cryogenic grinder, ultrafine grinder, high-speed grinder, pulverizer, disintegrator, homogenizer, burr mill, conical mill, centrifugal impact mill, vortex mill, agitated media mill, or oscillating granulator.

At step 68, the method 50 includes rinsing wet ground zeolite USY with distilled water and centrifuging to collect a milled zeolite USY. In some embodiments, centrifugation may be done at 500 rpm, preferably 1000 rpm, preferably 2000 rpm, preferably 3000 rpm, preferably 4000 rpm, preferably 5000 rpm. In a preferred embodiment, the centrifugation is done at 5000 rpm. In some embodiments, the centrifugation may be done for 0.5 to 8 hours, preferably 1 to 7 hours, preferably 1.5 to 6 hours, preferably 2 to 6 hours, preferably 2.5 to 6 hours, preferably 3 to 6 hours, preferably 3.5 to 6 hours, preferably 4 to 6 hours, preferably 4.5 to 5.5 hours. In a preferred embodiment, the centrifugation is done for 5 hours.

At step 70, the method 50 includes drying the milled zeolite USY at 60 to 100° C. for 60 to 120 min to form a dried zeolite USY. In some embodiments, the milled zeolite USY is dried at a temperature in a range from 40 to 120° C., preferably 60 to 100° C., preferably 70 to 90° C., preferably 75 to 95° C. In a preferred embodiment, the milled zeolite USY is dried at 80° C. In some embodiments, the milled zeolite USY is dried for 20 to 320 min, preferably 60 to 120 min, preferably 70 to 110 min, preferably 80 to 100 min, preferably 85 to 95 min. In a preferred embodiment, the milled zeolite USY is dried for 90 minutes.

At step 72, the method 50 includes crushing the dried zeolite USY to form a crushed zeolite USY nanoparticles. In some embodiments, the dried zeolite USY may be crushed by a hammer mill, ball mill, jet mill, pin mill, attritor mill, centrifugal mill, vibratory mill, planetary ball mill, roller mill, disc mill, pebble mill, bead mill, colloid mill, impact mill, cutter mill, knife mill, Wiley mill, rotor-stator mill, cryogenic grinder, ultrafine grinder, high-speed grinder, pulverizer, disintegrator, homogenizer, burr mill, conical mill, centrifugal impact mill, vortex mill, agitated media mill, or oscillating granulator. In a preferred embodiment, the dried zeolite USY is crushed using a mortar and pestle.

At step 74, the method 50 includes mixing triethylamine with a dispersion including crushed zeolite USY nanoparticles and carboxylated cellulose nanofibers to form a second reaction mixture. In some embodiments, the concentration of triethylamine in the second reaction mixture is in a range from 25 to 50 ml/L, preferably 35 to 40 ml/L, preferably 36 to 39 ml/L, preferably 36.5 to 37.5 ml/L. In a preferred embodiment, the concentration of triethylamine in the second reaction mixture is 37 ml/L. In some embodiments, the concentration of crushed zeolite USY nanoparticles in the second reaction mixture is in a range from 100 to 200 g/L, preferably 140 to 160 g/L, preferably 145 to 160 g/L, preferably 147 to 160 g/L, preferably 150 to 160 g/L, preferably 155 to 160 g/L, preferably 157 to 160 g/L. In some embodiments, the concentration of carboxylated cellulose nanofibers in the second reaction mixture is in a range from 100 to 200 g/L, preferably 140 to 160 g/L, preferably 145 to 160 g/L, preferably 147 to 160 g/L, preferably 150 to 160 g/L, preferably 155 to 160 g/L, preferably 157 to 160 g/L.

At step 76, the method 50 includes autoclaving the second reaction mixture at 60 to 80° C. for 15 to 30 hours, cooling, and centrifuging to collect a wet product. In some embodiments, the second reaction mixture is autoclaved ranges from 40 to 100° C., preferably 60 to 80° C., preferably 65 to 80° C., preferably 67 to 80° C., preferably 70 to 80° C., preferably 75 to 80° C., preferably 65 to 70° C. In a preferred embodiment, the second reaction mixture is autoclaved at 68° C. In some embodiments, the second reaction mixture is autoclaved for 10 to 40 hours, preferably 15 to 30 hours, preferably 17 to 28 hours, preferably 20 to 28 hours, preferably 22 to 26 hours, preferably 23 to 25 hours. In a preferred embodiment, the second reaction mixture is autoclaved for 24 hours.

At step 78, the method 50 includes drying the wet product at 50 to 80° C. for 15 to 30 hours to form the zeolite USY/carboxylated cellulose nanocomposite. In some embodiments, the wet product is dried at 30 to 100° C., preferably 40 to 90° C., preferably 50 to 80° C., preferably 55 to 75° C. In a preferred embodiment, the wet product is dried at 60-70° C. In some embodiments, the wet product is dried for 10 to 40 hours, preferably 15 to 30 hours, preferably 17 to 28 hours, preferably 20 to 28 hours, preferably 22 to 26 hours, preferably 23 to 25 hours. In a preferred embodiment, the wet product is dried for 24 hours.

In some embodiments, the zeolite USY/carboxylated cellulose nanocomposite has an adsorption capacity for iron ions of greater than or equal to 30 mg/g, preferably greater than or equal to 50 mg/g, preferably greater than or equal to 60 mg/g, preferably greater than or equal to 70 mg/g, preferably greater than or equal to 75 mg/g, preferably greater than or equal to 80 mg/g at 20° C. In a preferred embodiment, the zeolite USY/carboxylated cellulose nanocomposite has an adsorption capacity for iron ions of 80 mg/g at 20° C.

In some embodiments, the zeolite USY/carboxylated cellulose nanocomposite has an adsorption capacity for iron ions of greater than or equal to 60 mg/g, preferably greater than or equal to 82.5 mg/g, preferably greater than or equal to 85 mg/g at 30° C. In some embodiments, the zeolite USY/carboxylated cellulose nanocomposite has an adsorption capacity for iron ions of greater than or equal to 70 mg/g, preferably greater than or equal to 87.5 mg/g, preferably greater than or equal to 90 mg/g at 40° C.

In some embodiments, the zeolite USY/carboxylated cellulose nanocomposite has a magnetization in a range from 1.0 to 3.0 emu/g, preferably 1.5 to 2.25 emu/g, preferably 1.6 to 2.25 emu/g, preferably 1.7 to 2.10 emu/g, preferably 1.8 to 2.00 emu/g. In a preferred embodiment, the zeolite USY/carboxylated cellulose nanocomposite has a magnetization of 1.88 emu/g.

The following examples are provided solely for illustration and are not to be construed as limitations of the present disclosure, as many variations thereof are possible without departing from the spirit and scope of the present disclosure.

EXAMPLES

The following examples demonstrate a method of making a zeolite USY/carboxylated cellulose nanocomposite. The examples are provided solely for illustration and are not to be construed as limitations of the present disclosure, as many variations thereof are possible without departing from the spirit and scope of the present disclosure.

Example 1: Preparation of Nanofibers of Carboxylated Cellulose from Date-Palm Tree Leaflets (DPTL), (*Phoenix dactylifera* L.)

According to the present disclosure, dried leaflets of the date-palm tree were obtained from a local farm and used as raw materials. The raw materials were washed with tap water to remove dust, then washed using distilled water 3 times. Subsequently, the cleaned materials were ground using a stainless-steel grinder to achieve a particle size ranging from 1 millimeter (mm)-2 mm length. The nanofibers of carboxylated cellulose (NFCC), also referred to as carboxylated cellulose nanofibers (CCNFs), were directly prepared from ground date-palm tree leaflets, with a particle size ranging from 1 millimeter (mm) to 2 mm in length. A total of 20 grams (g) of the sample were placed into a 1000 milliliter (mL) round-bottom flask and mixed with 280 mL of nitric acid ($HNO_3$). Subsequently, 39 grams (g) of sodium nitrite ($NaNO_2$) were added slowly. Red fumes, attributed to the release of nitrogen dioxide ($NO_2$) gas, were observed during the initial phase of the reaction. The reaction proceeded for 10 hours at a temperature range of 80° C.-90° C. After completion of the reaction, the process was stopped by adding 300 mL of cooled distilled water (DW). The suspended fibers were then washed with distilled water 10 times using the decantation technique to neutralize the pH, which was measured to be 3.2. The resulting particles were collected by centrifugation at 12,000 revolutions per minute (rpm) for 15 minutes. The supernatant was discarded, and the nanofibers were collected and equilibrated with distilled water for 48 hours at room temperature.

Example 2: Preparation of Zeolite Nanoparticles by Ball Milling Technique

A mass of 3 g of zeolite USY was added into a ball-mill vial, followed by the addition of 27 mL of distilled water. A total of 12 balls, weighing 47 g, were added to the vial. The vials were then closed and sealed for the ball-milling process, which was carried out at 550 rpm for 8 hours. After the milling process, the sample was allowed to cool to room temperature. The suspended particles were collected by washing with distilled water and subjected to centrifugation at 5000 rpm for 5 hours. Following the centrifugation process, the particles were dried in an oven at 80° C. for 90 minutes (min). The dried particles were then crushed using a mortar and pestle. The recovery rate of the process was found to be 96%.

Example 3: Preparation of the Composite of Zeolite USY Nanoparticles and Carboxylated Cellulose Nanofibers (CCNFs)—Also Referred to as the Nanocomposite A mixture of 2 g of the prepared nanozeolite and 2 g of the prepared carboxylated cellulose nanofibers was combined with 13 mL of distilled water. The mixture was stirred for 10 min at room temperature of 25° C. After 10 min, 0.5 mL of triethylamine (TEA) was added, and the stirring continued for an additional 10 min to provide complete homogenization. The mixture was then transferred to an ultrasonic bath for sonication at room temperature for 15 minutes. Following sonication, the mixture was placed in a hydrothermal autoclave reactor to undergo the hydrothermal reaction at 68° C. for 24 hours in the oven. After the completion of the reaction, the autoclave was allowed to cool, and the material was collected through a centrifugation process at 1500 rpm for 15 min. The collected product, a nanocomposite of zeolite USY nanoparticles and carboxylated cellulose nanofibers (CCNFs), was dried at 60° C.-70° C. for 24 hours and stored in a desiccator for future use.

Example 4: Absorption

According to the present disclosure, a stock solution of iron(II) at a concentration of 1000 milligrams per liter (mg/L) was prepared using an analytical-grade iron(III) sulfate nonahydrate (Fe$_2$(SO$_4$)$_3$·9H$_2$O), purchased from ITES Varanov Co. The pH of the solution was adjusted to the desired value using hydrochloric acid (HCl) and sodium hydroxide (NaOH).

Example 5: Batch Adsorption Procedure

Initial solutions with varying concentrations of Fe(II) ions were prepared by diluting the stock solution of 1000 mg/L. In 50-mL stopped conical flasks, 1 g of the nanocomposite (nano-Z@NFCC) was placed into each flask. Subsequently, 25 mL of Fe(II) solution, prepared at different concentrations, were added to each flask. The pH, contact time, and temperature were controlled to the desired values.

Figure 8:
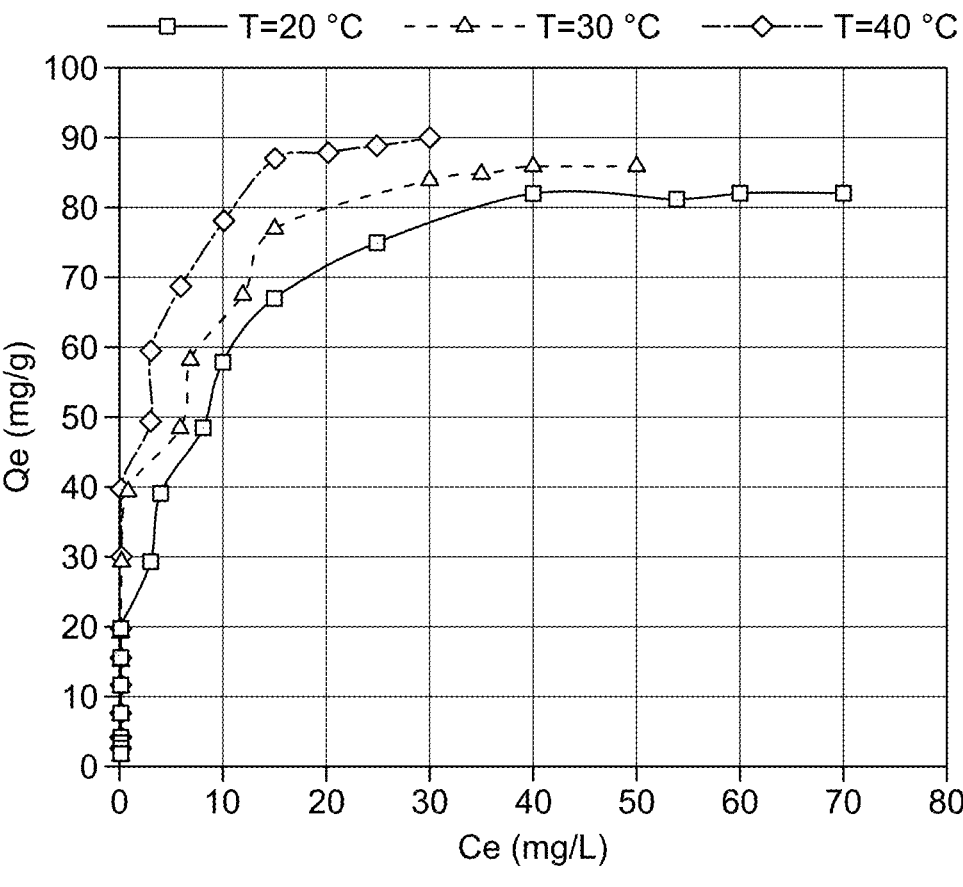
FIG. 8 illustrates an equilibrium adsorption isotherm curves of iron(II) ions, showing the amount adsorbed on the nanocomposite versus the initial concentration of iron(II) ions, according to certain embodiments.

The mixtures were shaken using a rotary shaker at a speed of 250 rpm for four hours. After completion of the shaking process, the mixtures were filtered using a centrifuge device. Further, the supernatants from each solution were analyzed using an inductively coupled plasma (ICP) instrument to determine the concentration of iron ions after interaction with the nanocomposite. The adsorbed iron ions concentrations were calculated from the mass balance equation on the batch adsorber as follows.

$$q_e = \frac{V(C_0 - C_e)}{M}$$

Where M is the mass of nano-Z/NFCC composite in grams (g), V is volume of the solution in liter (L), $q_e$ is the amount of adsorption milligrams per gram (mg g$^{-1}$), $C_o$ is the initial solution concentration of iron(II) milligrams per liter (mg L$^{-1}$) and Ce is the concentration of the iron(II) at equilibrium (mg L$^{-1}$). The amount of iron(II) ions adsorbed on the nano-Z/NFCC composite versus the initial concentration of iron(II) ions were plotted to obtain the equilibrium adsorption isotherm curves for 3 different temperatures, as shown in FIG. 8. The maximum capacity of the iron ion adsorption on the nano-zeolite/nanofibers of carboxylated cellulose composite at room temperature (20° C.) was 80 mg/g.

According to the present disclosure, the effect of temperature on the iron ions adsorption on the nanocomposite was examined over a temperature range from 20° C. to 40° C. The adsorption capacity increased as the temperature increased. Hence, the adsorption process of the iron ions of the nanocomposite was endothermic, as shown in FIG. 8. Therefore, increasing the temperature of the adsorption of iron ions of the nanocomposite was favorable.

Figure 2:
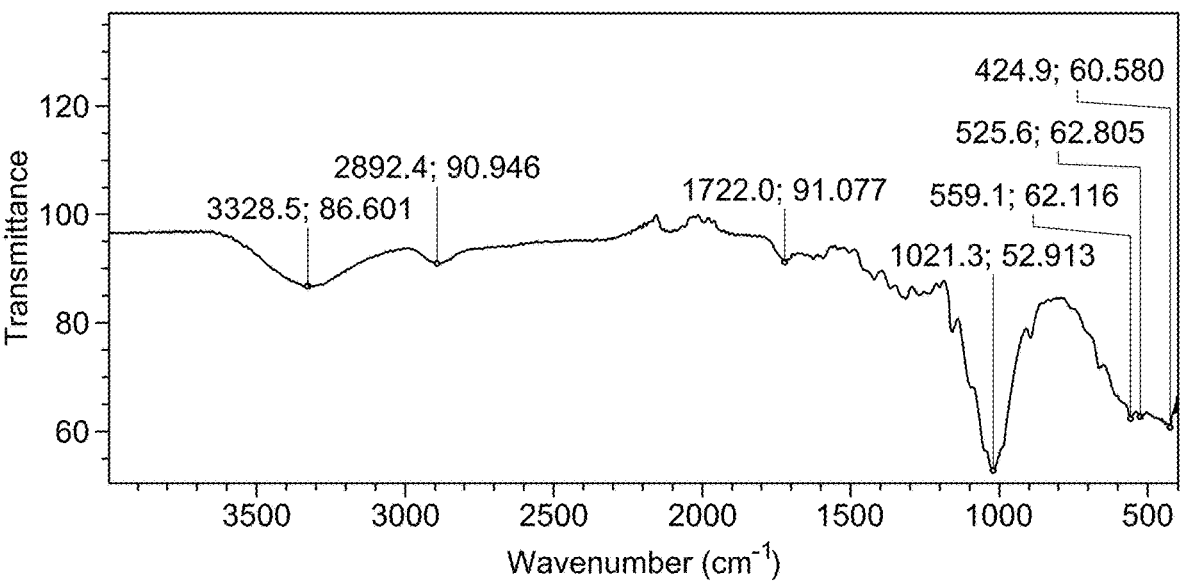
FIG. 2 is a Fourier transform infrared (FTIR) spectra of carboxylated cellulose nanofibers, according to certain embodiments.
Figure 3:
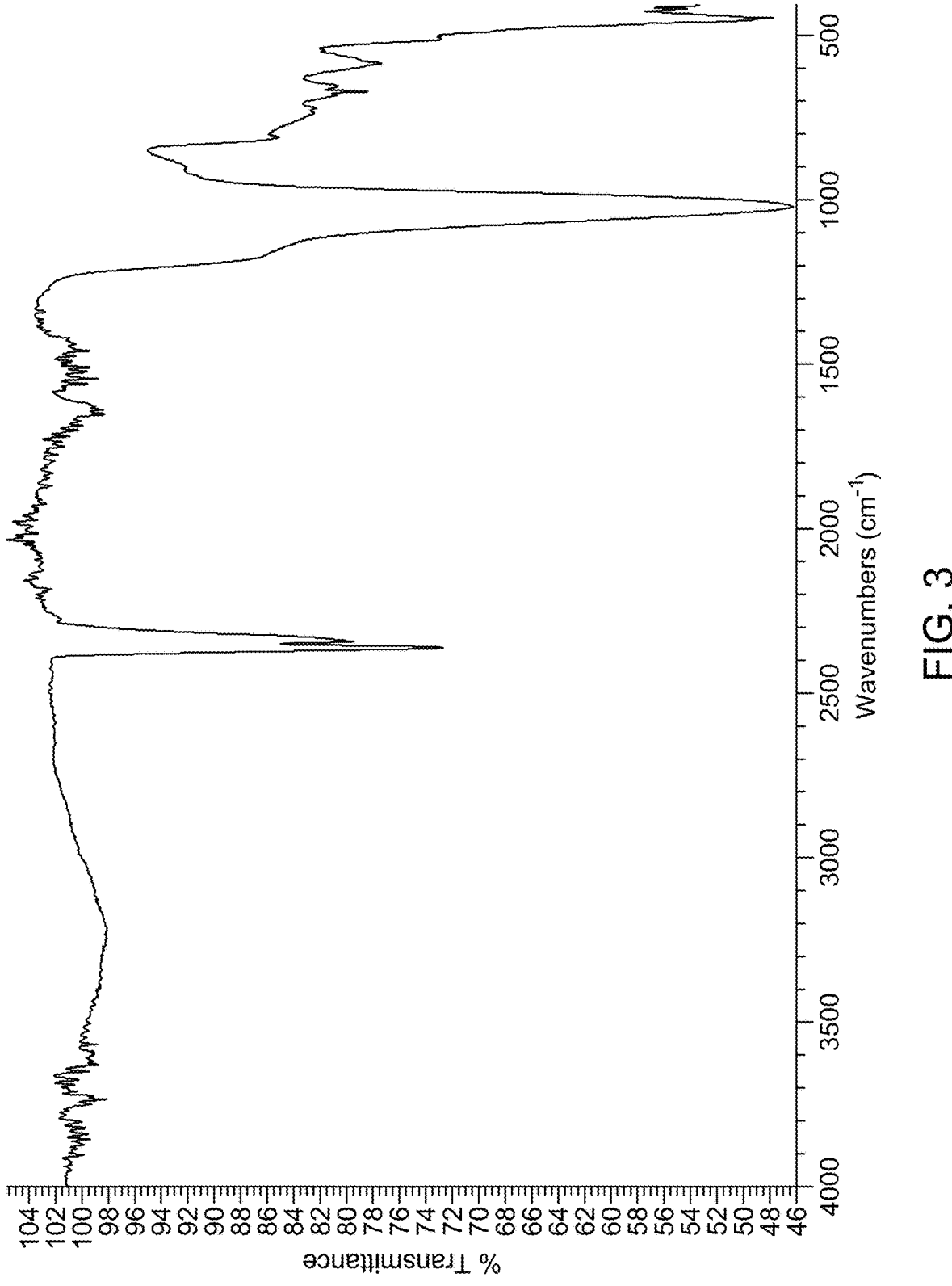
FIG. 3 is a FTIR spectra of a zeolite USY nanoparticles prepared via wet ball-milling, according to certain embodiments.
Figure 4:
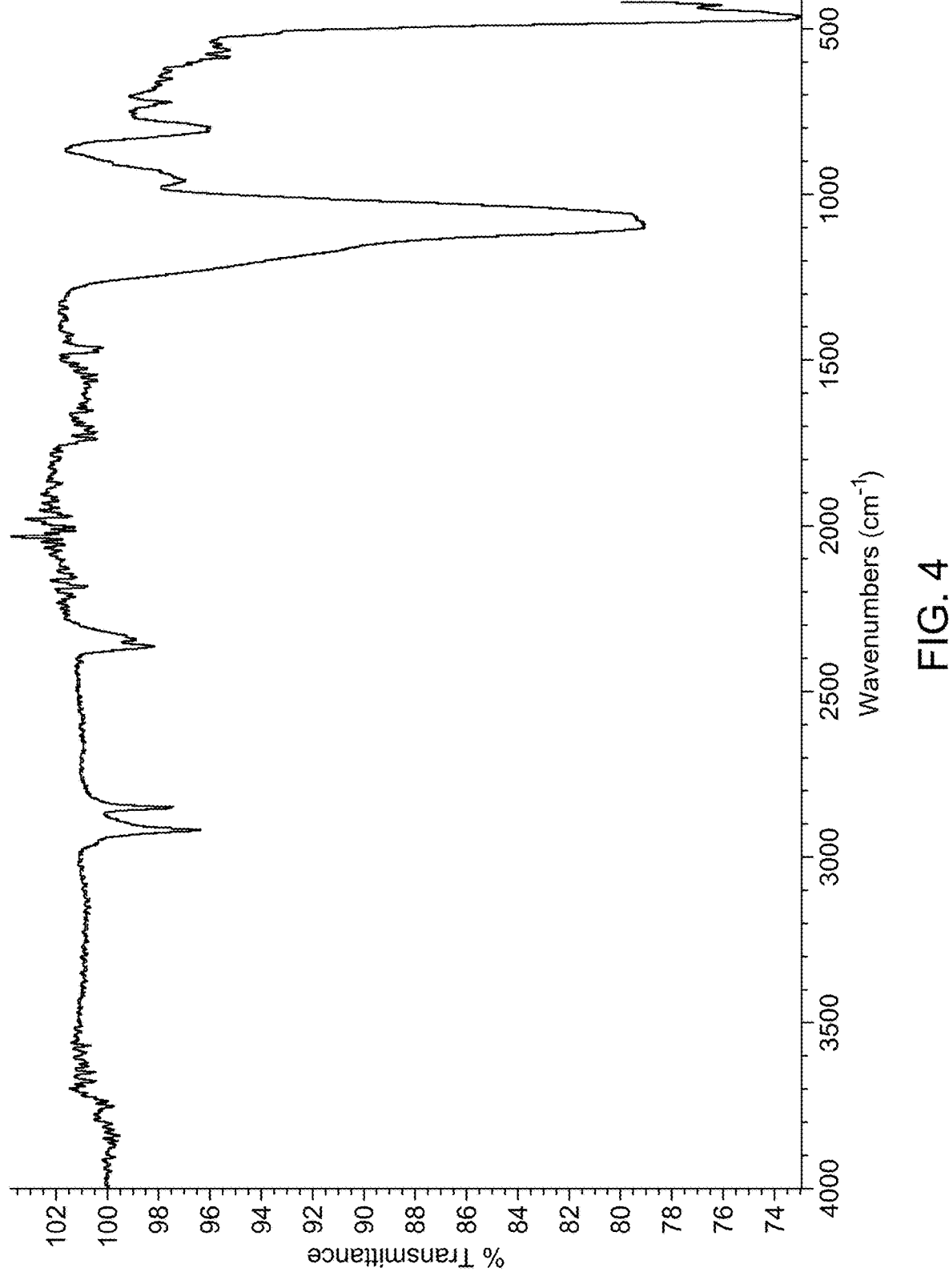
FIG. 4 is a FTIR of a nanocomposite of the zeolite USY nanoparticles and carboxylated cellulose nanofiber crystals, according to certain embodiments.

Fourier transform infrared (FT-IR) spectrum revealed a stretching vibration around 3341 cm$^{-1}$ due to the O—H bond, and the peak at 2892 cm$^{-1}$ was attributed to C—H stretching vibrations. The region between 1420 cm-1-1430 cm$^{-1}$ was due to H—C—H and O—C—H in-plane bending vibrations. A characteristic peak at 1429 cm$^{-1}$ and C—H deformation vibrations at 1376 cm$^{-1}$ represented characteristic peaks of celluloses. Additionally, a carbonyl functional group at 1722 cm$^{-1}$ indicated the presence of carboxyl groups (—COOH), as shown in FIG. 2. The band at approximately 480 cm$^{-1}$ was associated with Si—O bending vibrations. The symmetric and asymmetric stretching vibrations of Si—O—Al were observed at 1200 cm$^{-1}$, as shown in FIG. 3. A weak stretching vibration in the range of 2700 cm-1-2900 cm$^{-1}$ was attributed to the C—H bond, and weak peaks between 1500 cm-1-1720 cm$^{-1}$ indicated the presence of carboxylate salt (—COO—), as shown in FIG. 4.

Figure 5A:
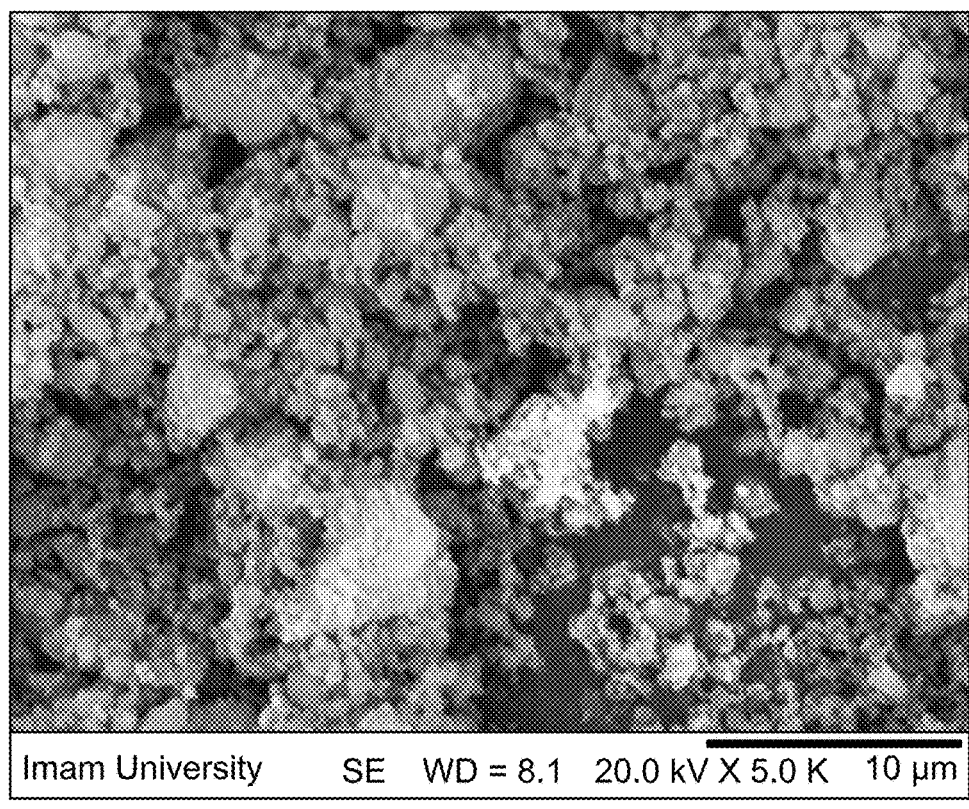
FIG. 5A shows scanning electron microscopy (SEM) image of the nanocomposite of the zeolite USY nanoparticles and the carboxylated cellulose nanofibers at a magnification of 10 micrometer (μm), according to certain embodiments.
Figure 5B:
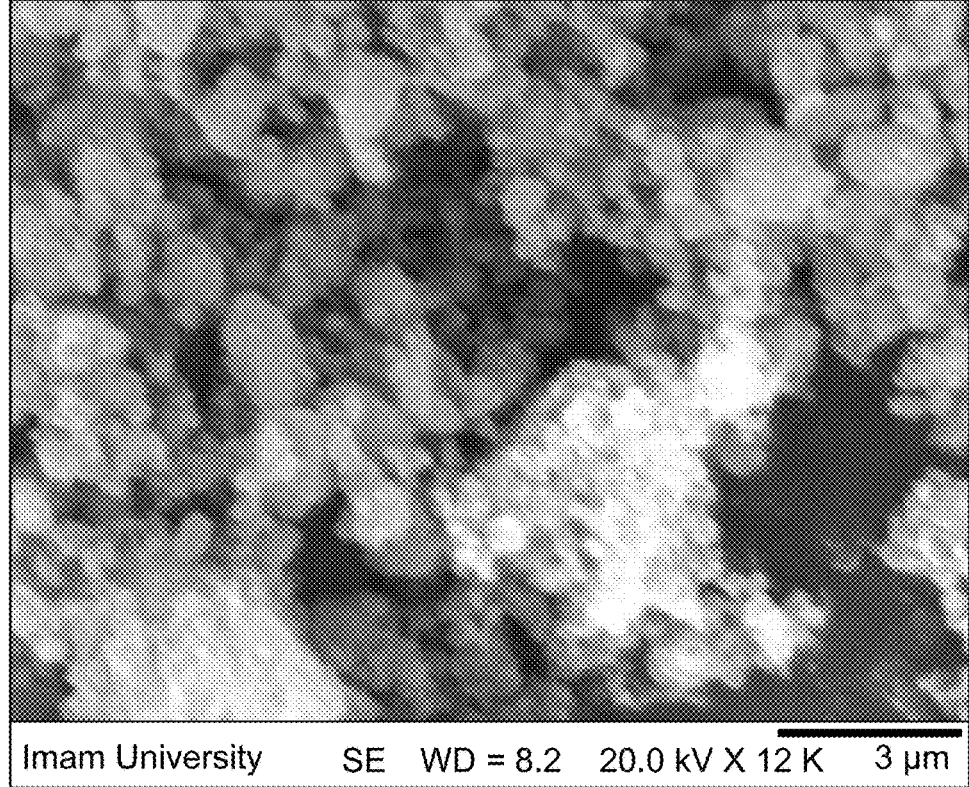
FIG. 5B shows scanning electron microscopy (SEM) image of the nanocomposite at a magnification of 3 (μm), according to certain embodiments.
Figure 5C:
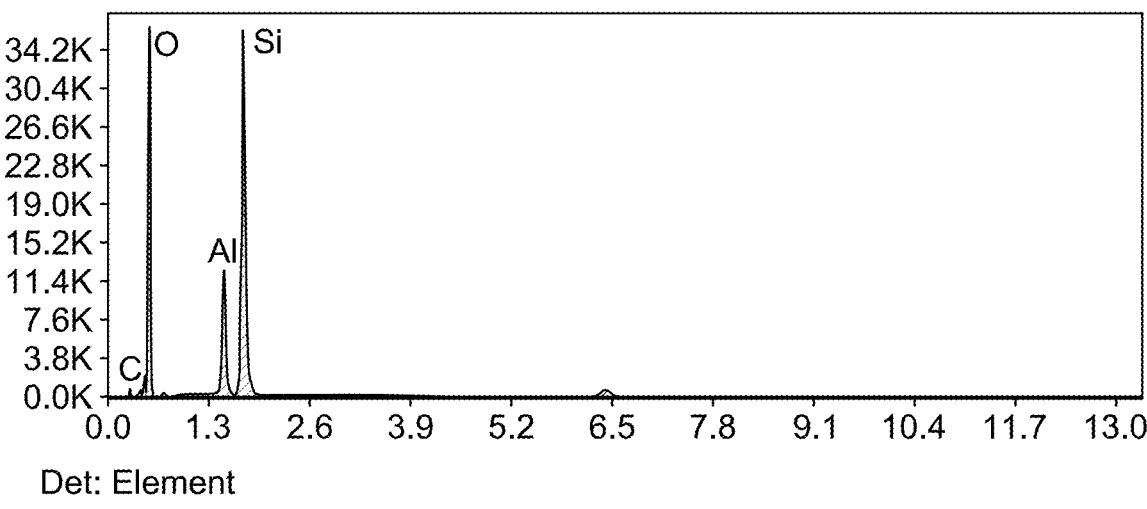
FIG. 5C shows energy dispersive X-ray (EDX) analysis of the nanocomposite, according to certain embodiments.

Scanning electron microscopy (SEM) images at different magnifications showed agglomeration in the nanocomposite, which may be due to the milling method used for the preparation of the nanocomposite, as shown in FIG. 5A-5B. EDAX analysis confirmed the presence of Si and O as major elements, as shown in FIG. 5C.

Figure 6:
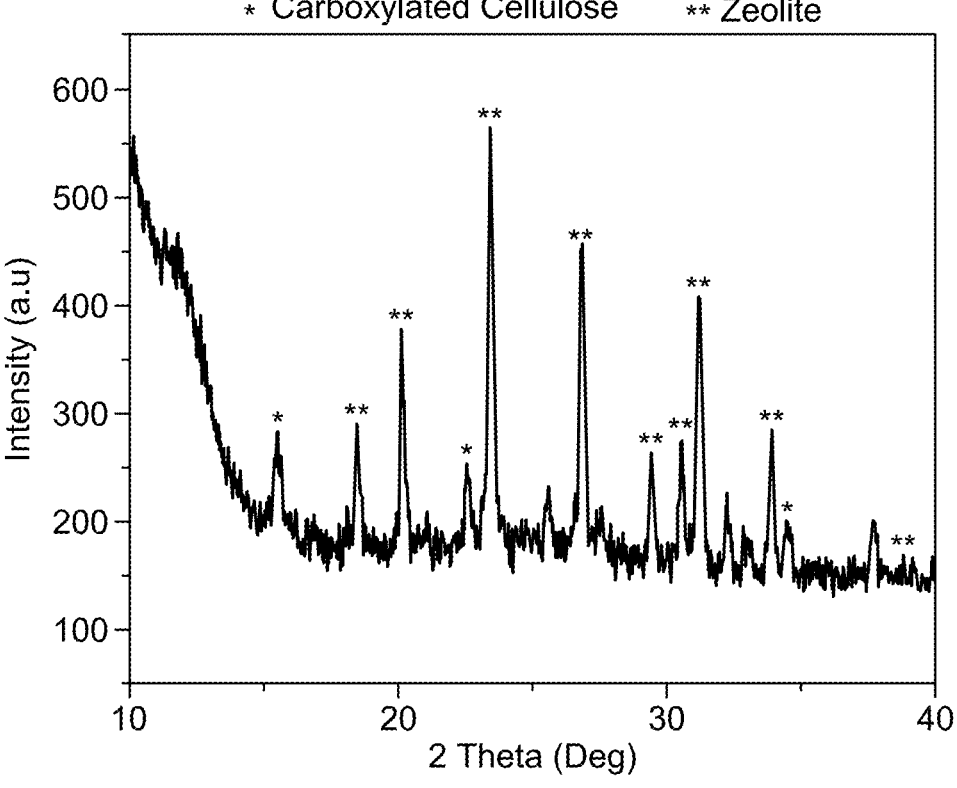
FIG. 6 shows X-ray Diffraction (XRD) patterns of the nanocomposite, according to certain embodiments.
Figure 7:
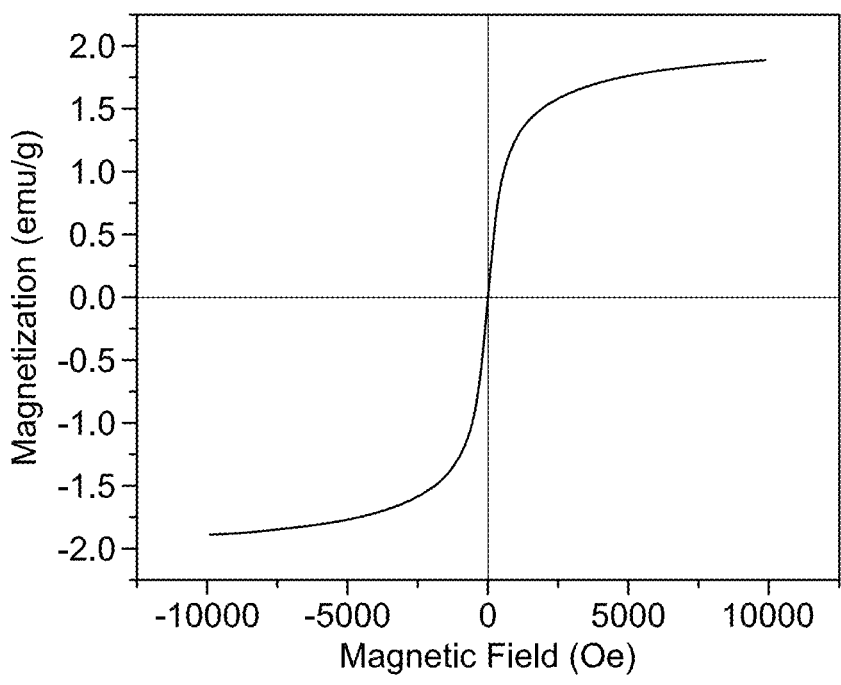
FIG. 7 depicts magnetization measurements at room temperature, according to certain embodiments.

X-ray diffraction (XRD) patterns exhibited well-defined diffraction peaks, indicating the high crystallinity of the nanocomposite. The peaks were indexed to zeolite and carboxylated cellulose, corroborating the formation of the nanocomposite, as shown in FIG. 6. The magnetization measurements at room temperature demonstrated that the nanocomposite exhibited ferromagnetic behavior with a saturation magnetization of 1.88 electromagnetic units per gram (emu/g), as shown in FIG. 7. This magnetic property enhances its potential for the removal of heavy metals from water. The equilibrium adsorption isotherm curves illustrate the amount of iron(II) ions adsorbed on the nanocomposite in relation to the initial concentration of iron(II) ions, as shown in FIG. 8.

The present disclosure provides a method for making an organically derived nanocomposite with carboxylated cellulose nanofibers, which were sourced from local resources, including the date-palm tree in the Kingdom of Saudi Arabia, and inorganic materials (nano-zeolite). The method includes, firstly, the mechanical wet-grinding of zeolite for 8 hours at 550 rpm using a Planetary Micro Mill PULVERISETTE 7 (Fritsch, Idar-Oberstein, Germany). Secondly, direct oxidation of date-palm tree leaflets was carried out to produce nanofibers of carboxylated cellulose using sodium nitrate and nitric acid in a one-pot reaction for 10 hours at 90° C. Thirdly, the carboxylated cellulose nanofibers and nano-zeolite were dispersed in water and mixed to form a suspension. Next, a cross-linking agent, triethylamine was added during stirring for 10 min. The mixture was then autoclaved in an oven at no less than 95° C. for 24 hours. After cooling and drying the mixture, a homogeneous film was formed. Finally, the rigid film was tested for the adsorption of organic metals.

Benefits of the present disclosure include using less energy to convert date-palm tree leaflets, a waste material, into carboxylated cellulose nanofibers through an oxidation process in a one-flask reaction. It also presents a green method for obtaining nano-zeolite without the use of chemicals. Additionally, the method provides an eco-friendly adsorbent for the removal of cationic micropollutants and a magnetic nanocomposite for the removal of heavy metals.

The present disclosure includes method for making a nanocomposite by dispersing nanozeolite and carboxylated cellulose nanofibers in water and mixing to form a mixture. The mixture was then dried by heating at a temperature of at least 60° C. to form a dry mixture. The dry mixture was mixed with a crosslinking agent to form a nanocomposite composition, which was heated at a temperature of at least 60° C. to form a paste. The paste was then dried and milled to form the nanocomposite. The carboxylated cellulose nanofibers were prepared from Saudi Arabian palm tree. Further, the preparation of CCNF was carried out by grinding dried date-palm tree leaflets to a particle size of 1 mm-2 mm, treating the ground leaflets with a mixture of nitric acid ($HNO_3$) and sodium nitrite ($NaNO_2$), and washing the treated leaflets with distilled water to obtain carboxylated cellulose nanofibers. Zeolite nanoparticles were prepared by ball milling zeolite USY in the presence of water. The CCNF from the first step was mixed with the zeolite nanoparticles in the presence of triethylamine, and the mixture was subjected to hydrothermal treatment to obtain the nanocomposite. The hydrothermal treatment was carried out at a temperature of 68° C. for 24 hours. The ball milling process was conducted at 550 rpm for 8 hours. The nanocomposite prepared by this method may be used for the adsorption of iron ions. For adsorbing iron ions from an aqueous solution, the solution was contacted with the nanocomposite. The adsorption process was carried out at a temperature range of 20° C. to 40° C., and involved the adsorption of Fe(II) ions.

The present disclosure provided a method for producing an eco-friendly magnetic nanocomposite material, and in particular a method of preparing a nanocomposite of nanozeolite and carboxylated cellulose nanofibers from date-palm tree leaflets sourced from Saudi Arabia. The method contributed to the production of environmentally friendly and biodegradable materials. These materials may be used for purifying water from pollutants, including both drinking water and treated sewage water. Furthermore, the prepared materials possess a high number of ionic sites for adsorbing cationic pollutants and exhibited ferromagnetic behavior, which offers benefits for the removal of heavy metals from water.

Numerous modifications and variations of the present disclosure are possible in light of the above teachings. It is, therefore, to be understood that within the scope of the appended claims, the disclosure may be practiced otherwise than as specifically described herein.

The invention claimed is:

1. A method of making a zeolite USY/carboxylated cellulose nanocomposite, comprising:

grinding date-palm tree leaflets to form ground date-palm tree leaflets;

adding $NaNO_2$ stepwise to a mixture comprising ground date-palm tree leaflets and $HNO_3$ to form a first reaction mixture;

stirring the first reaction mixture at 80 to 90° C. for 8 to 12 hours;

adding distilled water to the first reaction mixture to form a quenched mixture;

washing the quenched mixture with distilled water;

centrifuging the quenched mixture to collect carboxylated cellulose nanofibers;

equilibrating the carboxylated cellulose nanofibers in distilled water to form equilibrated carboxylated cellulose nanofibers;

wet ball milling zeolite USY to form wet ground zeolite USY;

rinsing wet ground zeolite USY with distilled water and centrifuging to collect a milled zeolite USY;

drying the milled zeolite USY at 60° C. to 100° C. for 60 to 120 min to form a dried zeolite USY;

crushing the dried zeolite USY to form crushed zeolite USY nanoparticles;

mixing triethylamine with a dispersion comprising crushed zeolite USY nanoparticles and carboxylated cellulose nanofibers to form a second reaction mixture;

autoclaving the second reaction mixture at 60° C. to 80° C. for 15 to 30 hours, cooling, and centrifuging to collect a wet product; and drying the wet product at 50° C. to 80° C. for 15 to 30 hours to form the zeolite USY/carboxylated cellulose nanocomposite.

2. The method of claim 1, wherein the zeolite USY/carboxylated cellulose nanocomposite has an adsorption capacity for iron ions of greater than or equal to 50 mg/g at 20° C.

3. The method of claim 2, wherein the zeolite USY/carboxylated cellulose nanocomposite has an adsorption capacity for iron ions of greater than or equal to 60 mg/g at 20° C.

4. The method of claim 3, wherein the zeolite USY/carboxylated cellulose nanocomposite has an adsorption capacity for iron ions of greater than or equal to 75 mg/g at 20° C.

5. The method of claim 4, wherein the zeolite USY/carboxylated cellulose nanocomposite has an adsorption capacity for iron ions of greater than or equal to 80 mg/g at 20° C.

6. The method of claim 1, wherein the zeolite USY/carboxylated cellulose nanocomposite has an adsorption capacity for iron ions of greater than or equal to 82.5 mg/g at 30° C.

7. The method of claim 6, wherein the zeolite USY/carboxylated cellulose nanocomposite has an adsorption capacity for iron ions of greater than or equal to 85 mg/g at 30° C.

8. The method of claim 1, wherein the zeolite USY/carboxylated cellulose nanocomposite has an adsorption capacity for iron ions of greater than or equal to 87.5 mg/g at 40° C.

9. The method of claim 8, wherein the zeolite USY/carboxylated cellulose nanocomposite has an adsorption capacity for iron ions of greater than or equal to 90 mg/g at 40° C.

10. The method of claim 1, wherein the zeolite USY/carboxylated cellulose nanocomposite has a magnetization in a range of 1.5 to 2.25 emu/g.

11. The method of claim 10, wherein the zeolite USY/carboxylated cellulose nanocomposite has a magnetization in a range of 1.75 to 2.00 emu/g.

12. The method of claim 11, wherein the zeolite USY/carboxylated cellulose nanocomposite has a magnetization of 1.88 emu/g.

13. The method of claim 1, wherein the concentration of $NaNO_2$ in the first reaction mixture is in a range from 130 to 150 g/L.

14. The method of claim 1, wherein the concentration of ground date-palm tree leaflets in the first reaction mixture is in a range from 60 to 80 g/L.

15. The method of claim 1, wherein the concentration of triethylamine in the second reaction mixture is in a range from 35 to 40 ml/L.

16. The method of claim 15, wherein the concentration of triethylamine in the second reaction mixture is 37 ml/L.

17. The method of claim 1, wherein the concentration of crushed zeolite USY nanoparticles in the second reaction mixture is in a range from 140 to 160 g/L.

18. The method of claim 1, wherein the concentration of carboxylated cellulose nanofibers in the second reaction mixture is in a range from 140 to 160 g/L.

19. The method of claim 1, wherein the second reaction mixture is autoclaved at 65° C. to 70° C. for 24 hours.

* * * * *